May 7, 1946.  S. Y. WHITE  2,399,701
DEVICE FOR TUNING OR ADJUSTING TO CLOSE LIMITS
Filed Nov. 6, 1942  7 Sheets-Sheet 2

INVENTOR.
Sidney Y. White

BY Moses & Nolte
ATTORNEYS

May 7, 1946.  S. Y. WHITE  2,399,701
DEVICE FOR TUNING OR ADJUSTING TO CLOSE LIMITS
Filed Nov. 6, 1942  7 Sheets-Sheet 3

Fig.4.

INVENTOR.
Sidney Y. White
BY Moses & Nolte
ATTORNEYS

May 7, 1946.  S. Y. WHITE  2,399,701
DEVICE FOR TUNING OR ADJUSTING TO CLOSE LIMITS
Filed Nov. 6, 1942  7 Sheets-Sheet 6

INVENTOR.
Sidney Y. White

BY Moses & Nolte
ATTORNEYS

May 7, 1946.   S. Y. WHITE   2,399,701
DEVICE FOR TUNING OR ADJUSTING TO CLOSE LIMITS
Filed Nov. 6, 1942   7 Sheets-Sheet 7

INVENTOR.
Sidney Y. White
BY Moses & Nolte
ATTORNEYS

Patented May 7, 1946

2,399,701

UNITED STATES PATENT OFFICE 2,399,701

DEVICE FOR TUNING OR ADJUSTING TO CLOSE LIMITS

Sidney Y. White, Wilmette, Ill., assignor to Victor S. Johnson, Chicago, Ill.; Alex Thomson administrator of said Victor S. Johnson, deceased Application November 6, 1942, Serial No. 464,812

19 Claims. (Cl. 74—568)

This invention relates to a device for adjusting or tuning to close limits and relates to certain improvements on the adjusting device disclosed in patent application Serial No. 439,509, filed April 18, 1942, in my name. In said application a spacing member in the form of a cam provided with a plurality of steps is interposed between an operated member and an operating member having a limited range of movement which is continuous and finely graded. The operated member is illustrated as the tuning means for tuning a radio circuit and the adjustable gage block of a gage for gaging the size of articles. In the present application, although the invention is illustrated only in connection with the tuning means of a radio circuit, it will be understood that the invention is not limited to such use but that it is of general utility wherever an adjustment of such member to close limits is desired. By rotating the cam it is possible to displace the operated or tuning member to different positions relative to the operating member for any given position of the latter, so that the operated member may for any of its positions, as determined by the setting of the cam, be moved through a limited range of movement by operation of the operating member. In the herein illustrated form of the invention, the cam is provided with a plurality of steps adapted to impart successive steps of movement to the operated member, which movements are equal to each other and also equal or substantially equal to the limited range of movement of the operating member. Such relationship is not necessary, however, for the practice of the invention, and it will be understood that for certain purposes the several steps of the cam may be unequal, and also that the limited amount of movement imparted to the operated member by the actuation of the operating member may be more or less than any one step of movement imparted to the operated member in response to rotation of the cam. In the illustrated embodiment of the invention, the operated member is a push rod which carries a powdered iron core, this core being movable within the coil of a circuit of a radio tuner. Each step of the cam is designed to move the push rod a distance of .010 inch and to tune the radio circuit over a range of 1 megacycle.

It is a purpose of the present invention to provide an operating member to secure a continuous movement of the tuner push rod or other operated member in the form of a threaded screw having a fine pitch, the screw operating directly against the cam and without the interposition of a lever or other operating connections between these members. Screws of fine pitch are extremely difficult and expensive to manufacture with a constant pitch, small variations in the pitch usually appearing from one turn of the thread to another. Such variations in pitch between the different threads introduce corresponding errors in the setting of the tuning means in cases where the screw is arranged to be rotated through several revolutions. It is a purpose of the present invention to eliminate such errors in the setting of the tuning or other operated member by limiting the rotation of a fine pitch screw to somewhat less than a full revolution so that the same identical threads on the screw are always operative in securing the continuous adjustment of the tuning member.

It is a further object of the invention to provide in connection with such fine pitch screw a graduated continuous dial associated therewith, the graduations of the dial being such that the setting of the tuning member may be read off directly on the dial in kilocycles. This dial is preferably mounted closely adjacent to and concentric with a discontinuous dial which is mechanically connected to the cam and indicates in megacycles the setting of the tuning member as secured by the rotary cam. Thus the two dial readings may be easily and conveniently read through the same window opening provided in the receiver casing. As in the case of the aforementioned application, in the illustrated embodiment of the invention the frequency of the resonant circuit of the radio tuner may readily be determined by merely adding the two dial readings together.

Where a fine pitch screw is utilized to adjust the tuning or other device, for accurate adjustment it is essential that all backlash and other lost motion between the threads of the screw and the stationary nut in which it is mounted be reduced to the minimum. A feature of the present invention lies in the provision of means for loading the screw so that any backlash or other lost motion is minimized. For obtaining this result the nut in which the screw is mounted is provided with spaced apart threaded portions which engage regions of the screw threads that are spaced apart by a substantial distance so that any tendency of the screw to move vertically or sidewise in its supporting nut is entirely obviated. Each of such threaded portions of the nut is cut away to form a tongue which projects from the main body portion of the nut, which tongue may be bent slightly inwards so that the threads formed thereon come into firm and intimate contact with the threads of the screw. A non-circular clamp or adjusting ring is provided surrounding each tongue and keeping it continually biased into intimate engagement with the threads of the screw, so that the screw is at all times loaded and all backlash or other lost motion is reduced to the minimum.

As in the aforementioned application, the rotary cam is provided on its rear face with a plurality of balls which come into successive engagement with the push rod of the tuning member to advance it step by step. An important feature of the present invention relates to the provision of means for adjusting the thickness of the cam in the region of each ball. For this purpose the front face of the cam is provided opposite each ball with a tapered surface and a correspondingly tapered compensating block is provided which is slidable along such surface for adjusting the thickness of the cam in the region of each ball. In the illustrated embodiment of the invention, each such tapered compensating block is slidable in a groove formed in the front surface of the cam, and means are provided in the form of spring means associated with each block for retaining it in its adjusted position in the groove. In the illustrated form of the invention two springs are provided for each block, one of which biases the block against the bottom wall of the groove, and the other of which biases it against a side wall thereof. It is a cognate object of the invention to so shape and arrange these springs with reference to the compensating blocks that they do not cause any creeping of the blocks in their grooves during the use of the tuning device which would change the setting of the tuning means.

A related object of the invention consists in the provision of means associated with each compensating block whereby it may be adjusted inwardly and outwardly along its groove. In an illustrated form of the invention, the spring which biases the block against the side of its groove is so shaped that its outer end extends beyond the outer end of the block so that a tool may be placed against the end of the spring to adjust the block inwardly along the groove. In one illustrated form of the invention, the outer end of such spring is formed in the shape of a hook, so that a tool may be inserted in such end to pull the spring and block outwardly in its groove if for any reason such adjustment of the block should be required. The closed casing in which the cam is mounted is provided with an opening in alignment with the end of one of the springs through which such adjusting tools may be inserted for adjusting the several blocks one after another. A plug is provided for closing this opening to seal the casing. In a modified form of the invention illustrated, the outer end of the block-retaining spring is not provided with a hook shaped end, but the compensating block itself is provided with an opening into which the end of a tool may be inserted to pull the block outwardly in its groove.

A further feature of the invention resides in the provision of means for moving the cam axially during its rotation and while one adjusting block is moving out of engagement with the end of the adjusting screw until the next block comes into engagement therewith, thus preventing the end of the adjusting screw from striking against the side edges of the adjusting blocks as the cam is rotated to adjust the tuning means in steps. In the illustrated form of the invention, the spring fingers which bias the blocks against the bottom of the grooves in which they are seated are provided with curved recesses in their front faces, the curved marginal walls of these recesses coming into engagement with a conical shaped surface provided on the adjusting screw near the end thereof which engages the adjusting blocks. These curved marginal walls on the spring fingers come successively into engagement with the aforementioned conical surface and thus displace the cam rearwardly each time the cam is rotated through one step.

A still further object of the invention resides in the provision of means for minimizing errors in setting of the tuning means due to wear of the end of the push rod which operates such means and which engages the balls of the cam. In the illustrated embodiment of the invention the end of the push rod is provided with a groove having curved side walls which provide two zones of line contact with each ball on opposite sides of the high point thereof. The zones of contact with the ball thus provided are much more extensive than merely point contact therewith, thus reducing the wear on the end of the push rod to a negligible amount.

A still further important feature of the invention lies in the provision of means for resiliently supporting the radio tuner or other device within a substantially closed casing for limited freedom of movement in all directions, so that any shocks or vibrations imparted to the casing are largely absorbed by the resilient supporting means, and thus prevented from affecting the setting of the tuning means. In the illustrated embodiment of the invention, three resilient supports are provided for the chassis of the radio tuner, one at the rear thereof and two others at spaced apart regions on the front thereof. The resilient supports at the front not only serve to resiliently support the front end of the chassis, but also serve as transmitting means for transmitting the rotation of two adjusting knobs disposed in front of the casing to the cam and to the feed screw which operates the tuning member. These resilient supports are so arranged that they transmit only torque to the rotary drive members of the tuner, any vertical or sidewise component of force applied to the tuning knobs being taken up by the front panel of the tuner casing and not communicated to the drive members which serve to operate the tuner. The tuning knobs are designed to conceal such resilient supporting members from view, thus enhancing the appearance of the device. Further and more detailed objects of the invention will become apparent as the description thereof proceeds.

No claim is made herein to radio tuning means, for the reason that such subject matter is claimed in my divisional application, Serial No. 538,347, filed June 2, 1944, for Radio tuning means.

For a better understanding of the invention, reference is made to the following description taken in connection with the accompanying drawings, in which.

Figure 1:
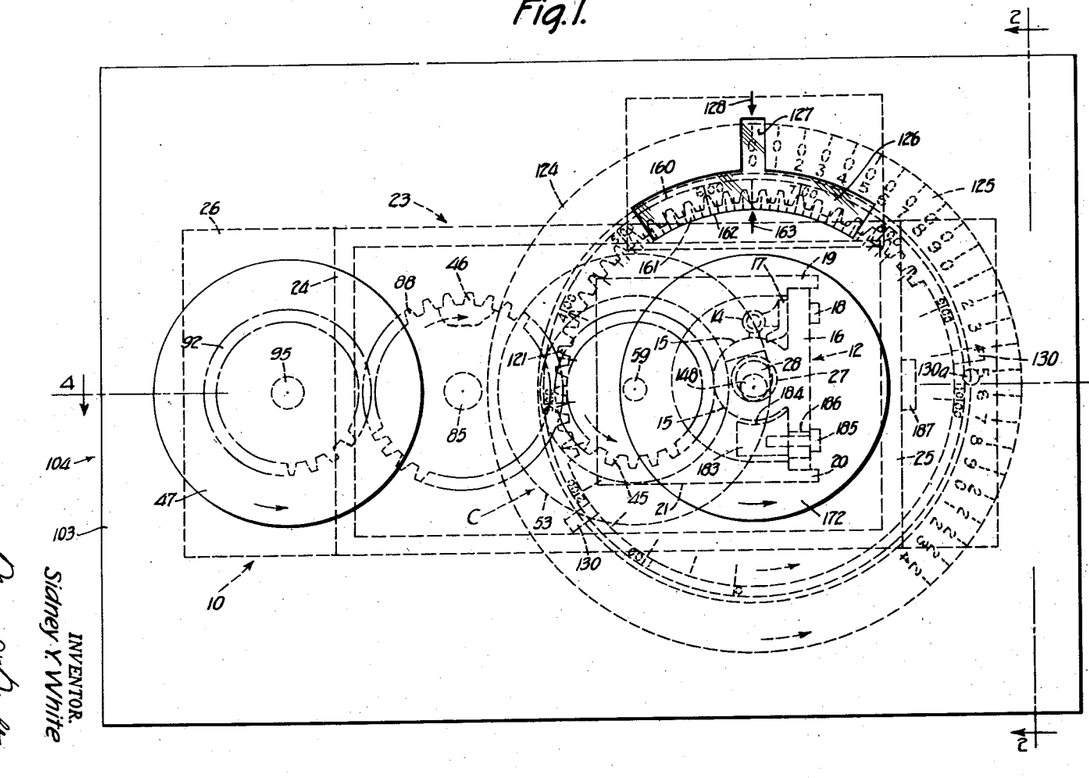
Fig. 1 is a front view of a radio tuner embodying the invention.
Figure 2:
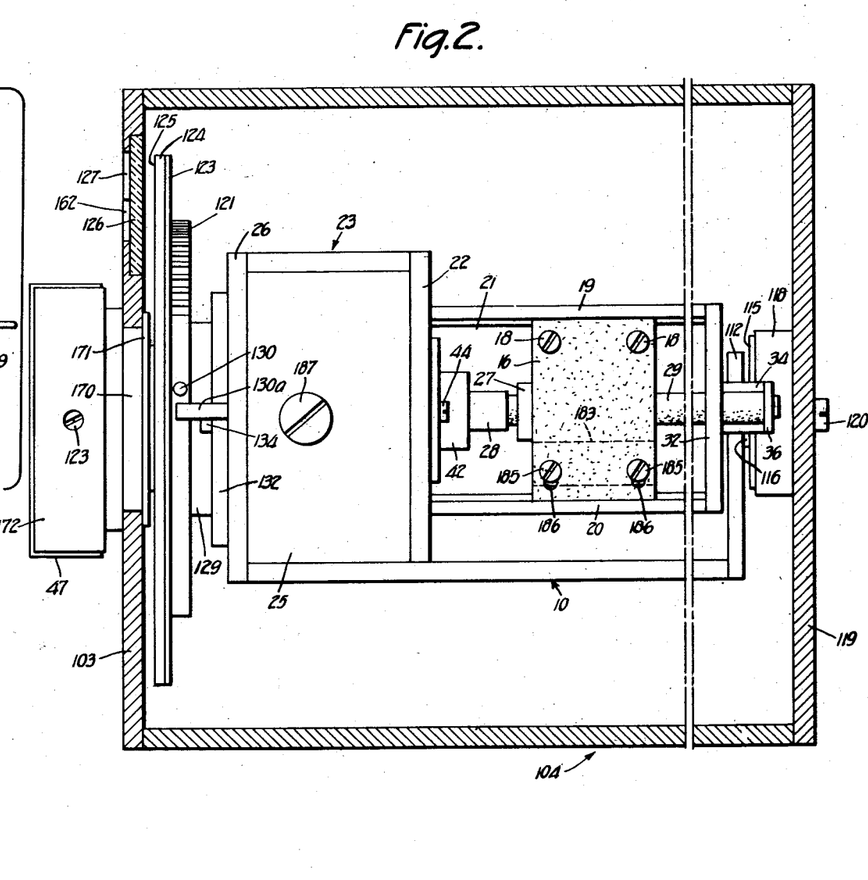
Fig. 2 is a vertical sectional view of the tuner of Fig. 1 taken on the line 2—2 thereof.
Figure 4:
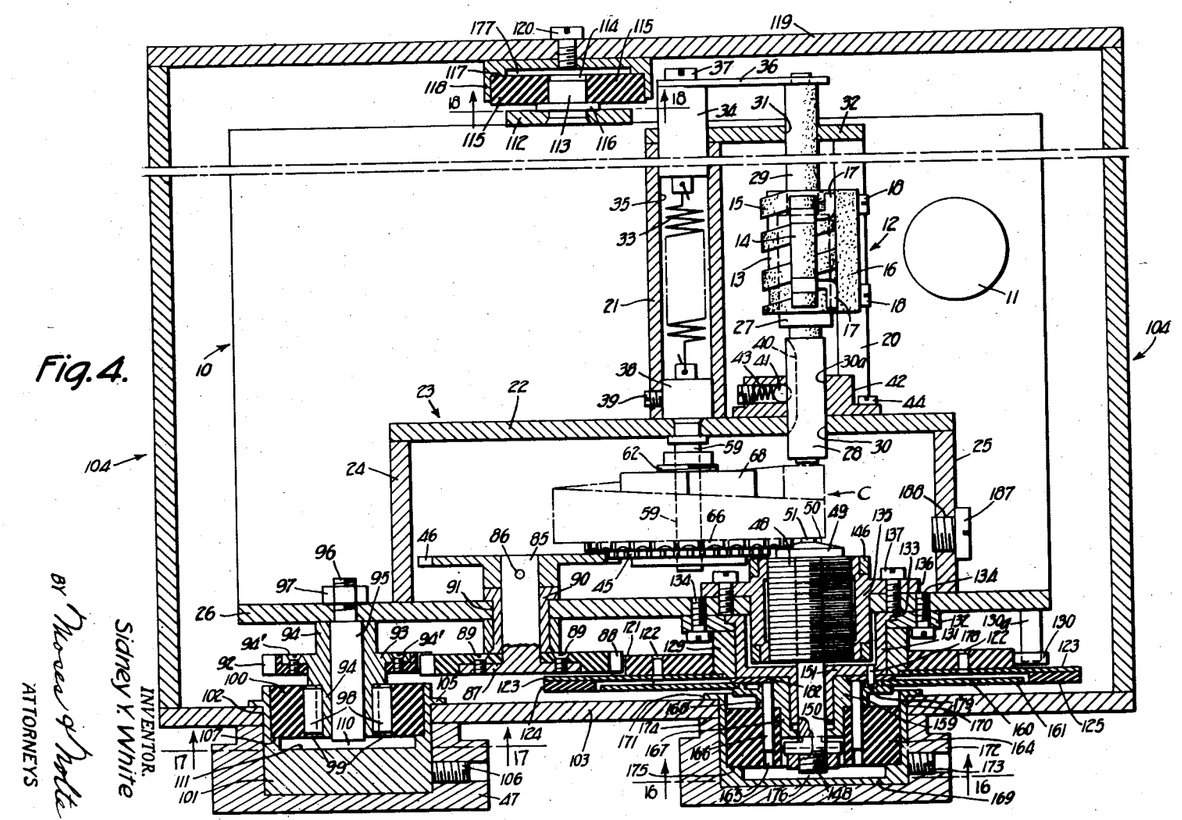
Fig. 4 is a horizontal sectional view of the tuner of Fig. 1 taken on the line 4—4 thereof.

Referring to Figs. 1, 2 and 4, the invention is shown in connection with a radio tuner adapted to be tuned to ultra-high frequencies of the order of 100 to 125 megacycles. The tuner is especially adapted for mobile use where it may be subjected to shocks and jars caused by rough handling and to extreme changes in temperature and humidity, the tuner being constructed so that such changes have no effect on its tuning. The chassis 10 of the tuner comprises an oscillator tube 11 (see Fig. 4) provided with a tunable tank circuit 12 comprising a coil 13 formed of silver ribbon and a condenser 14 of fixed capacity whose ends are connected across the ends of coil 13. Coil 13 is wound in a helical groove formed in a cylindrical tube 15 of ceramic material which is fused to and supported by a rectangular block 16 also of ceramic material. The ends of coil 13 are soldered to a pair of silver blocks 17 which are secured to the supporting block 16 by the screws 18 which also serve as the terminals of the resonant circuit. The block 16 is clamped between the upper and lower walls 19—20 of a generally U shaped die casting 21 which extends from the rear wall 22 of a closed casing 23. The side walls 24—25 (Fig. 4) of casing 23 are secured by any suitable means (not shown) to the front wall 26 of chassis 10. The circuit 12 is tuned by means of a cylindrical powdered iron core 27 which is mounted on a push rod 28, the portion 29 of rod 28 on which the core 27 is mounted being of insulation material, as shown. Push rod 28 is guided in openings 30 and 31 provided, respectively, in the wall 22 and the rear wall 32 of the die casting 21. Push rod 28 is biased forwardly with a force preferably of a pound or more, by means of a spring 33 (Fig. 4) whose rear end is connected to a plunger 34 slidable in a cylindrical bore 35 formed in the casting 21, the plunger 34 having readily separable connection with the rear end of the rod 28 by a bar 36 which is secured to the end of plunger 34 by a screw 37. The tension of spring 33 may be regulated by means of a rod 38 to which the front end of the spring is connected, and which is clamped in position in the bore 35 by a screw 39. To prevent rotation of push rod 28 during its longitudinal adjustment, it is provided along one side thereof near its front end with a groove 40 (see Figs. 4 and 12) in which a ball 41 is seated, the ball being carried by a bushing 42 and biased inwardly by a spring 43. The bushing 42 is secured to the rear wall 22 of casing 23 by the screws 44 and is provided with a bore 30a which assists bore 30 in supporting and guiding the push rod 28 during its longitudinal adjustment.

Figure 10:
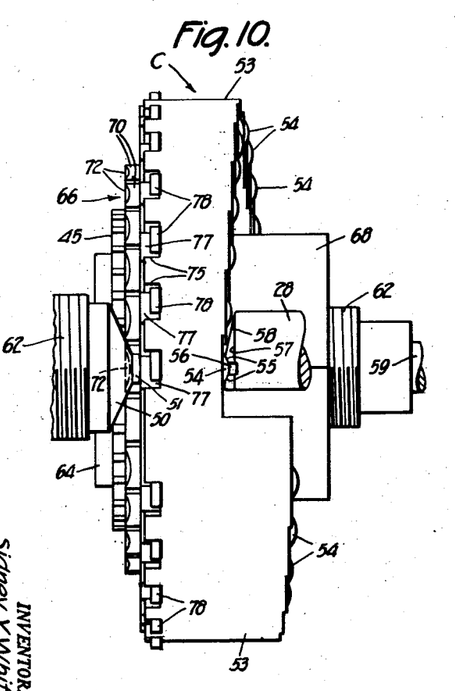
Fig. 10 is a side view of the drive cam of the tuner showing also the ends of the adjusting screw and the tuner push rod.
Figure 11:
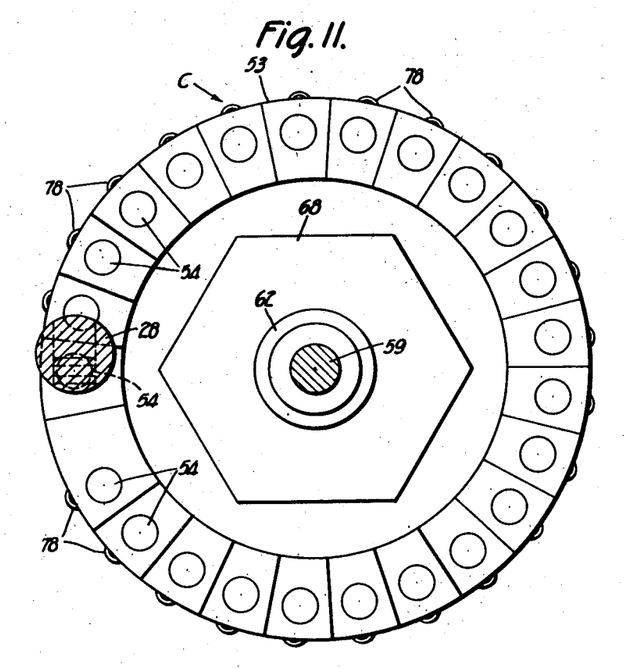
Fig. 11 is a rear view of the cam shown in Fig. 10 also showing the end of the tuner push rod operated by the cam.

Referring to Figs. 1, 4 and 10, the front end of push rod 28 engages a floating cam C which is mounted for both rotation and longitudinal movement, the cam being rotated by a gear 45 which is driven by a meshing gear 46 the latter gear being driven by a tuning knob 47 through connections to be later described. Rotation of the cam C by the knob 47 and gear 45 serves to rapidly tune the resonant circuit 12 in steps through a large range of frequencies in a manner to be later described. The cam C is also adapted to be moved bodily in a rearward direction to tune circuit 12 through a smaller range of frequencies by means of an adjusting screw 48 of fine pitch as, for example, 75 threads per inch. Screw 48 may be suitably made of monel metal, and at its rear end has rigidly secured thereto a button 49 of tough steel such as Ohio Airdy (see Fig. 12). Button 49 has a conical shaped intermediate portion 50 and terminates in a tip 51 of reduced diameter, the rear end of tip 51 being ground to have a smooth spherical curvature as indicated at 52, a suitable radius of such curvature being about 5 inches.

Figures 5, 6, 7, 8, 9:
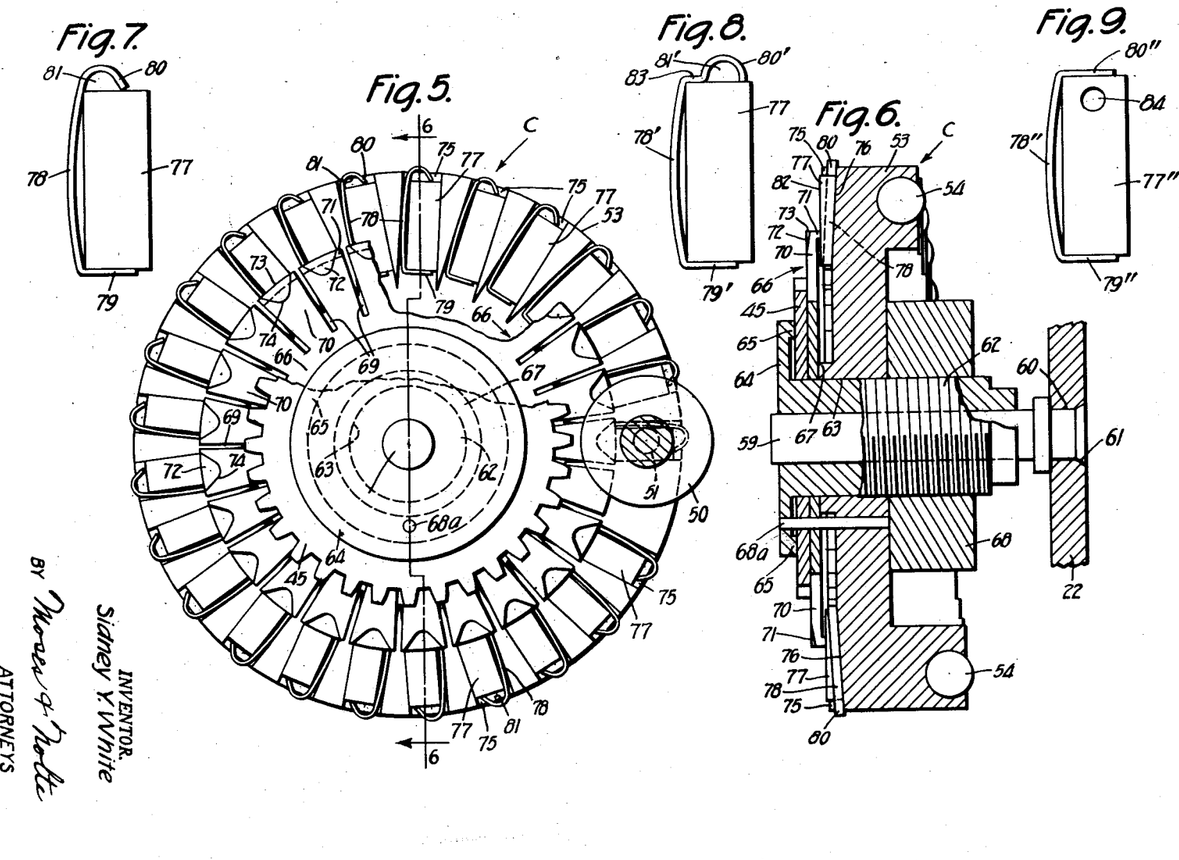
Fig. 5 is a front view with portions cut away showing the drive cam of the tuner.
Fig. 6 is a vertical sectional view of the cam shown in Fig. 5 taken on the line 6—6 thereof.
Fig. 7 is a front view, showing on an enlarged scale, one of the cam adjusting blocks and its retaining spring.
Figs. 8 and 9 show modified forms of cam adjusting blocks with their retaining springs.

For a more detailed description of step cam C reference is made to Figs. 5, 6 and 7 wherein it is shown as comprising a disc shaped cam member 53 which is preferably formed as a die casting of aluminum alloy having a composition of approximately 4% copper, 6% silicon and 90% aluminum. The rear face of cam disc 53 is provided with 24 steps of increasing thickness, a hardened steel ball 54 being secured in each step in a manner described in the above noted application. The balls are of the same diameter and are all disposed at the same radius from the center of cam disc 53, the bearing face of each ball being elevated exactly .010 inch above that of the next adjacent ball. As the cam is rotated, the balls are arranged to come successively into engagement with spaced apart surfaces 55 formed on the end of push rod 28 (see Figs. 10 and 12), a deeper horizontal slot 56 being formed between the surfaces 55 so that the high point of the ball is clear of the push rod. Vertical cuts 57 are made in the end of the push rod at each side of the surfaces 55, so that both of these surfaces are of the same length to permit of their being conveniently lap finished simultaneously to a smooth finish, the radius of curvature of which is the same as that of the balls 54.

Figure 12:
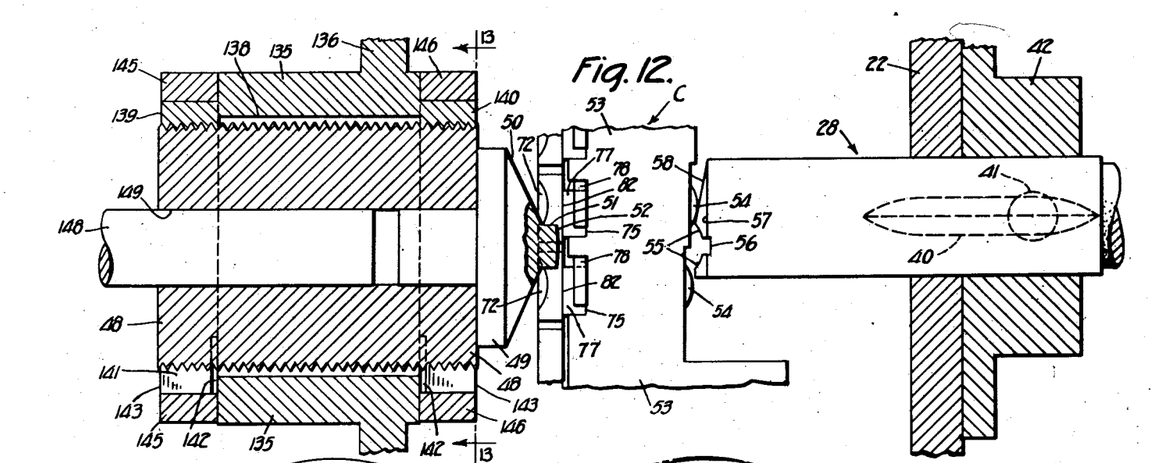
Fig. 12 is an enlarged fragmentary view partly in section showing the adjusting screw, a portion of the cam and the cooperating end of the push rod with the cam at an intermediate position between two tuner setting positions thereof.
Figures 14, 15:
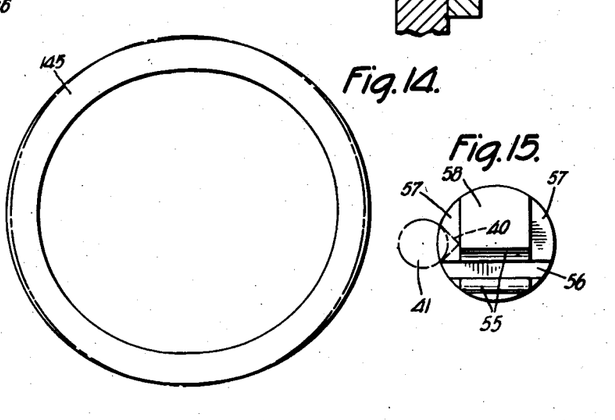
Fig. 14 is a view of a clamping ring for a nut of the adjusting screw showing its elliptical shape before being placed in position.
Fig. 15 is a front view showing the front end of the tuner push rod.
Figure 16:
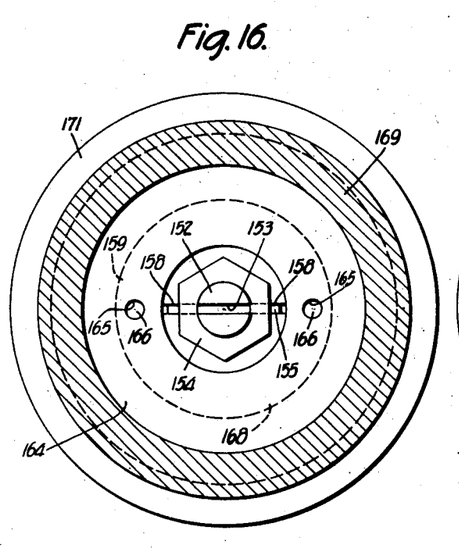
Fig. 16 is a vertical section on an enlarged scale taken on the line 16—16 of Fig. 4 showing portions of the driving connections to the tuner adjusting screw.

From the upper surface 55 the top of the push rod tapers gradually rearwardly as indicated at 58, Figs. 10, 12 and 15. By this construction the position of the push rod at each setting of the cam is not determined by the high point of the ball, which tends to wear away more rapidly than other portions thereof, but by lower zones on the ball which have line engagement with the curved surfaces 55. The construction also operates substantially the same in either direction so that the amount of torque required to be applied to the tuning knob 47 (Fig. 4) is substantially the same whether the push rod 28 is to be stepped forwardly or rearwardly by the cam.

Cam disc 53 is mounted for rotation and longitudinal movement on a horizontal spindle 59 whose rear end is secured in a bore 60 provided in the vertical wall 22 (Fig. 6), the spindle being secured by having its end riveted over, as indicated at 61. A threaded screw 62 passes through an opening 63 provided at the center of cam disc 53, the front end of screw 62 having an enlarged cylindrical head 64 which is provided with a short shoulder 65 which engages the front face of gear 45. A member 66 formed of resilient material as, for example, Phosphor bronze is disposed between gear 45 and a forwardly extending shoulder 67 provided at the center of cam disc 53. The several parts comprising the cam are secured together by a pin 68a and a nut 68 which is threaded on the rear end of screw 62. A plurality of radial slits 69 are formed in member 66 which define a series of radially extending spring fingers 70, the outer end of each finger being provided with a short lug 71. The front face of each spring finger near the outer end thereof is cut away to form a tapered surface 72 which is deepest at the outer end of the finger, as indicated at 73, and merges with the front surface of the finger in the curve 74 (Fig. 5).

Means is provided for adjusting the thickness of cam C at the region of each ball 54. For this purpose the front surface of cam disc 53 is provided with a plurality of radially extending grooves 75 whose bottom walls 76 are inclined at a small angle as, for example, 2 degrees with reference to a vertical plane through the front face of the cam disc, this angle being exaggerated in the drawings for the purpose of clarity. Disposed in each of the grooves 75 is a thin compensating block 77 whose front surface is vertical and whose rear surface is tapered at an inclination of the order of 2° and is seated against the bottom wall 76 of the groove 75. The rear surface of each block 77 is biased against the bottom wall 76 of its groove by means of one of the spring fingers 70, the lug 71 on which bears against the front surface of the compensating block, as shown in Figs. 5 and 6. Each block 77 is also held firmly in engagement with one side wall of its groove 75 by means of a spring 78 which is disposed between the side of the compensating block and the other side wall of the groove 75. The ends of spring 78 engage the ends of the compensating block 77 and in the from of the invention shown in Figs. 5 and 7 the inner end 79 of the spring lies flat against the inner end of the compensating block while the outer end 80 of the spring is in the shape of a hook, thereby providing an opening 81 between the outer end of the block and the end of the spring for a purpose to be later described. Since a compensating block 77 is provided opposite each ball 54 it will be readily understood that as a block is moved radially inward within its groove 75, due the gradual slope of the bottom wall 76 of the groove, the distance between the ball 54 and the front vertical surface 82 of the block will be gradually increased, the compensating blocks thus affording a means for readily regulating the thickness of the cam within close limits at the region of each ball. The spring fingers 70, together with the springs 78, provide means for retaining the compensating blocks in their adjusted positions, so that they do not move within their grooves during operation of the radio device.

Modified forms of springs are shown in Figs. 8 and 9. In the form shown in Fig. 8 the outer end 80' of the spring terminates in a short flat portion 83 which rests against the outer end of the compensating block 77 so that if the block is pushed inwardly along its groove by means of a tool applied to the outer end 80' of the spring, all the applied force will be transmitted to the outer end of the block 77 and none of it transmitted to the bowed portion of the spring. Such force applied to the bowed portion might set up a strain therein which would remain after the adjustment of the block and possibly cause the block to creep slightly along its groove 75 for a short distance upon the operation of the device. Such creeping of the compensating block would change the thickness of the cam slightly at this region and introduce a slight error in the setting of the push rod 28.

In the form of the invention shown in Fig. 9 the outer end 80'' of spring 78'' is straight and bears against the outer end of compensating block 77'' so that any radial pressure applied to the end 80'' of the spring is entirely taken up by the compensating block, and none of it is transmitted to the bowed portion of the spring. Thus no strain is stored up in the bowed portion which might tend to cause the compensating block to creep along its groove 75 slightly during the operation of the device. An opening 84 is provided in the outer end of the block 77'' wherein the end of a tool may be inserted to pull the block outwardly along its groove in the cam disc 53 for a purpose to be later described.

Figure 17:
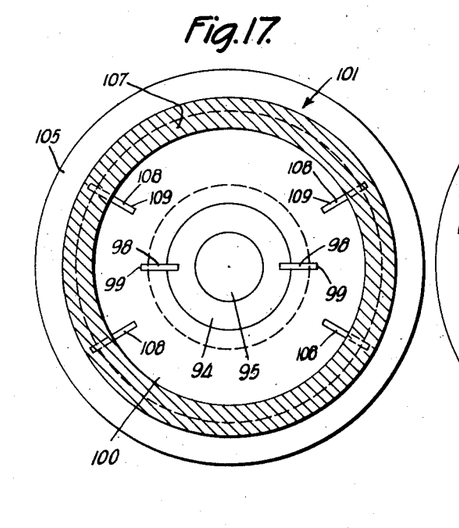
Fig. 17 is a vertical section on an enlarged scale taken on the line 17—17 of Fig. 4 showing portions of the driving connections to the cam.
Figure 18:
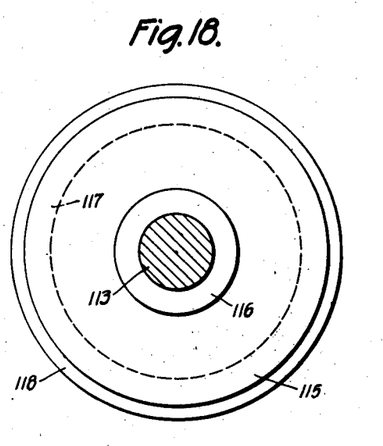
Fig. 18 is a vertical section on an enlarged scale taken on the line 18—18 of Fig. 4 showing the resilient supporting means for the rear end of the tuner chassis.

For transmitting the rotation of knob 47 (see Figs. 4 and 17) to gear wheel 46 and cam C, the gear 46 is secured to a shaft 85 as by a pin 86, the front end of shaft 85 being enlarged to form a disc 87 to the rear surface of which a Bakelite gear wheel 88 is secured by screws 89. The shaft 85 is journaled for rotation in a tubular bearing 90 which is secured to the front wall 26 and extends through an opening 91 provided in this wall. Gear wheel 88 is in turn driven by a Bakelite gear wheel 92 which is secured to an enlarged central portion 93 of a hollow supporting hub 94 as by screws 94'. The hub 94 is journaled for rotation on a short spindle 95 whose rear end extends through an opening provided in the wall 26 and is threaded as at 96, to receive a lock nut 97 which secures the spindle 95 in position. At its front end the hub 94 is provided with a pair of outwardly extending, radially disposed thin fins 98 whose outer ends are seated in a pair of shallow grooves 99 formed in a rubber supporting collar 100. The collar 100 is in turn supported in a rotatable metallic supporting cup 101 which is disposed in a circular opening 102 in the front panel 103 of a closed casing 104 in which the radio chassis 10 is resiliently supported for a limited degree of movement in all directions. The cup 101 is provided with an outwardly extending flange 105 which bears against the rear surface of the wall 103 and tuning knob 47 is provided with a threaded screw 106 for securing it to the cup 101, the rear face of knob 47 bearing against the front surface of panel 103, as shown in Fig. 4. Cup 101 near its front end is provided with a reduced shoulder portion 107 which bears against the front surface of rubber collar 100 to take up the end thrust of such collar in a forward direction. Cup 101 is shown as provided with four fins 108 (see Fig. 17) which extend radially inwards into corresponding grooves 109 provided in the rubber collar 100 so that rotation of the cup 101 is transmitted to the rubber supporting collar 100 and by the latter through the fins 99 to the hub 94 and gear wheel 92. It will be observed in Fig. 4 that there is a clearance space 110 provided between the end of spindle 95 and the interior end wall 111 of the cup 101.

From the above description it will be readily understood that the rubber collar 100 not only serves as a portion of the means used to transmit the rotation of tuning knob 47 to cam C, but also serves as a means for resiliently supporting a portion of the chassis 10 at its front end with limited freedom of movement in all directions within the casing 104.

The means for resiliently supporting the rear end of the chassis for limited movement in all directions comprises a vertically disposed narrow plate 112 (see Figs. 2 and 4) to the upper end of which is secured a short cylindrical stud 113 which is disposed in a central opening 114 formed in a rubber supporting collar 115. The stud 113 has an enlarged flange portion 116 whose rear surface bears against the front surface of rubber collar 115 and transmits any rearward thrust of the chassis 10 to the center portion of the rubber collar. Such end thrust is taken up by a shoulder 117 provided on a hollow supporting cup 118 in which the collar 115 is seated and which is secured in a fixed position on the rear vertical wall 119 of casing 104 by a threaded screw 120.

For indicating the tuning of circuit 12 and the setting of core 27 as determined by the rotation of knob 47, gear 88 drives a Bakelite gear wheel 121 (see Figs. 1 and 4) to whose front face is secured by pins 122 a thin metallic disc 123. Disc 123 carries near its outer periphery a Bakelite ring 124 whose front face constitutes a graduated dial 125, the graduations being discontinuous and shown as extending from 100 to 124 megacycles, see Fig. 1. These graduations appear behind a glass 126 set in a window opening 127 provided in front panel 103, a suitable index mark 128 being provided on panel 103. At their centers gear wheel 121 and disc 123 are secured to a hub 129 which is mounted for free rotation on the peripheral surface of the rear end portion of a hollow outboard bearing member 131. Bearing member 131 is secured in fixed position on the chassis wall 26 by a retaining collar 132 which extends inwardly and overlies an outwardly projecting flange 133 formed at the rear end of member 131. Collar 132 is secured in position on wall 26 by any suitable means, as by the screws 134. The rotation of the cam C and the dial 125 are limited to less than one revolution by two stops 130 on the gear 121 which engage with a pin 130a fixed on the plate 26.

Figure 13:
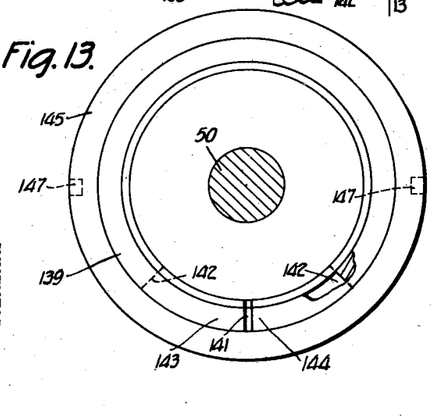
Fig. 13 is a vertical section of the adjusting screw of Fig. 12 taken on the line 13—13 thereof.

Referring to Figs. 4, 12 and 13, adjusting screw 48 is supported for rotation in a hollow supporting nut 135 which is provided with an outwardly extending flange 136 through which pass securing screws 137 which secure the nut to the vertical wall 26. Throughout its center portion nut 135 is cut away as indicated at 138, to provide a clearance space between the center portion of adjusting screw 48 and the center portion of the nut. The front and rear end portions 139 and 140 of the nut are interiorly threaded to receive the screw 48 and at the bottom each of the end portions 139—140 is cut vertically as indicated at 141, Fig. 13, and is also cut vertically in a direction normal to the axis of screw 48 at a distance from the end of the nut as indicated at 142. Two threaded loading fingers 143 and 144 are thus formed which may be forced slightly inwardly to load the screw 48 and eliminate the major portion of the backlash between the screw and nut. Each end portion 139 and 140 of the nut has its outer surface cut away to receive a pair of clamping collars 145—146 which are slightly elliptical in shape before being placed in position on the nut portions 139 and 140, the eccentricity of the members 145—146 being shown on an exaggerated scale in Fig. 14 in which the dot and dash line represents a circle. Each clamp member 145 and 146 is provided with a pair of shallow bores 147 adapted to receive the end of a spanner wrench used for rotating the clamp to bias its loading finger 143—144 into firm engagement with the threads of screw 48. It will also be understood that any wear of the threads of screw 48 resulting from the continued use of the device may be taken up by slightly rotating the clamping collars 145 and 146 on the nut. The illustrated means for supporting the adjusting screw by nut portions which engage the threads of the screw at spaced apart regions thereof provides against any sidewise, vertical or endwise undesired motion of the screw in the nut so that only the desired longitudinal movement of the screw due to its rotation is secured.

Figure 3:
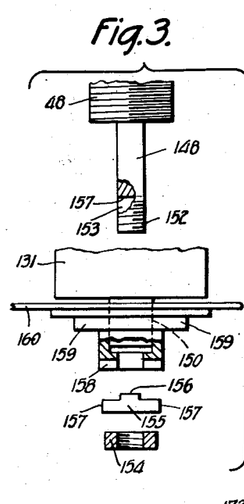
Fig. 3 is a view partly in section showing the driving connections to the adjusting screw of the tuner disassembled.

Screw 48 is rotated by means of a short shaft 148 whose rear end extends into a bore 149 provided in the screw and is a drive fit in the bore (see Figs. 4 and 12). Shaft 148 is firmly supported for rotation in a forwardly projecting hub 150 formed on the outboard bearing member 131 and which is connected thereto by a radial flange 151. The front end of shaft 148 (see Figs. 3 and 4) is threaded as at 152, and is provided with a thin longitudinally extending slot 153, a nut 154 being screwed on to the threaded end portion thereof. Nut 154 engages the front end of a thin flat key 155 whose inner end 156 becomes seated against the rear wall 157 of the slot 153. The outer ends 157 of the key are disposed in a narrow slot 158 formed in the front end of a rotatable hollow cup member 159 which is supported for rotation on the supporting hub 150. Cup 159 has secured to its outer periphery a thin circular disc 160 whose front surface constitutes a graduated dial 161 whose graduations are continuous and disposed closely adjacent to those of the dial 125 and appear through a circumferentially extending portion 162 of the window opening 127 (see Fig. 1). An index mark 163 is formed on the panel 103 adjacent to the graduations of dial 161. The hollow cup 159 is rotated by means of a rubber supporting collar 164 which is provided with a pair of holes 165 into which extend a pair of forwardly projecting pins 166 which are carried by the cup 159. The front end 167 of cup 159 is reduced in diameter to provide a shoulder 168 which engages the rear face of rubber collar 164, as shown in Fig. 4. Rubber collar 164 is seated in a hollow retaining cup 169 which is rotatable in a bore 170 provided in the front panel 103, the cup 169 having at its end an outwardly turned flange 171 which engages the rear face of the panel. The cup 169 is in turn rotated by a tuning knob 172 which is secured to the cup by a set screw 173, the rear face 174 of the knob 172 being disposed against the front surface of the vertical panel 103, as shown in Fig. 4.

The front face of rubber collar 164 near its periphery bears against a shoulder 175 provided on the retaining cup 169. The rubber supporting collars 100 and 164 thus provide means for resiliently supporting the front portion of the radio chassis 10 at spaced apart regions thereof with limited freedom of movement in all directions within the casing 104 while the rubber collar 115 similarly supports the rear portion of the chassis. Any forward movement of the chassis which might result from shocks or vibrations imparted thereto is limited by the rubber collars 100 and 164 which absorb the shock and transmit it to the panel 103, the portion of collar 164 within the shoulder 175 on cup 169 bulging forward slightly, a suitable clearance space 176 being provided beyond the front end of adjusting screw shaft 148 for this purpose. The portion of rubber collar 100 disposed inwardly of the shoulder 107 on cup 101 similarly bulges forward a slight amount. Any rearward movement of the chassis resulting from shock or vibration is limited and absorbed by the rubber collar 115, the portion thereof which is disposed inwardly of the shoulder 117 on supporting cup 118 bulging rearwardly a slight amount, a suitable clearance space 177 being provided at the rear of collar 115 for this purpose. Any vertical or sidewise movement of the chassis 10 resulting from shock or vibration is transmitted to and absorbed by all three of the rubber collars 100, 115 and 164.

Figure 19:
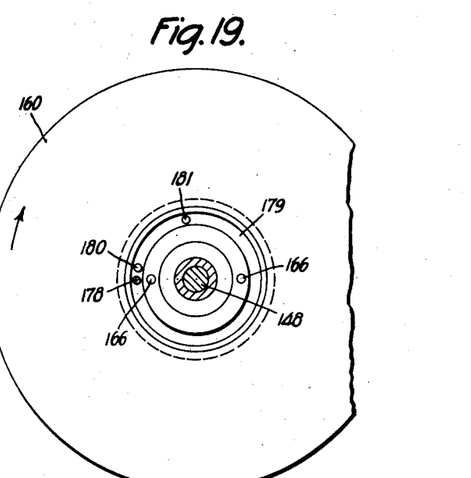
Fig. 19 is a rear view of the continuous dial of the tuner and its associated parts, with the dial adjusted to its zero position.

The rotation of adjusting screw 48 and continuous dial 161 is limited to substantially three-fourths of a revolution by means of a pin 178 (Figs. 4 and 19) which is set in the flange 151 and projects forwardly into a shallow circular groove 179 provided in the rear face of cup 159. A pair of spaced apart pins 180, 181 (Fig. 19) are set in the rear face of cup 159 and extend rearwardly into the groove 179 where one or the other of them comes into engagement with the pin 178 as the tuning knob 172 is rotated to its extreme position in one direction or the other. A thin washer 182 (Fig. 4) is interposed between the dial disc 160 and the flange 151 to separate the dial disc 160 slightly from dial disc 123 so that the two dials do not rub together.

Referring to Figs. 1 and 2, the ceramic block 16 is shown as also supporting a compressed powdered iron block 183 shown as having an arcuate upper face 184. The block 183 is adjustably secured in position on supporting block 16 by a pair of screws 185 which pass through narrow vertical slots 186 formed in the block 16.

A suitable material for the compensating blocks 77 is #440 stainless steel which has been hardened to a degree of 62 Brinell. The steel balls 54 are preferably nitrided to harden their surfaces while the push rod 28 may be made of Ohio Airdy steel. The nut 135 may be made of Tobin bronze, and the springs 78 and 33 of Phosphor bronze. The device is designed to prevent any change in position of substantial amount of the iron core 27 with reference to its coil 13 due to changes in temperature of the apparatus. This compensation is secured not by making the apparatus of relatively non-expanding material such as Invar, but by assuring that the parts which determine the distance between core 27 and coil 13 and the front wall 26 expand and contract together by equal amounts so that the relative position of the core and coil remains unchanged.

In using the radio tuner the dial 125 is set at 124 and the dial 161 is set at 1000. The coil 13 is now adjusted lengthwise of push rod 28 by slightly spreading apart the upper and lower walls 19 and 20 of the die casting 21, see Figs. 1, 2 and 4, a special expanding tool (not shown) being provided for this purpose, whereupon the coil supporting block 16 is slid along the walls 19 and 20 until the oscillator circuit 12 is tuned to exactly 125 megacycles, as indicated by the sum of the readings on the dials 125 and 161. The expanding tool is then removed, whereupon the supporting block 16 becomes firmly clamped in position by the walls of casting 21, it being found that this clamping action is adequate to prevent the supporting block from moving thereafter even when the radio tuner is subjected to sudden shocks or considerable vibration. The core 27 is now in its extreme forward portion with reference to coil 13, cam disc 53 is in the position shown in Figs. 5, 6, 10 and 11, and the bearing surfaces 55 on the end of push rod 28 are in engagement with the lowest ball 54, as shown in Fig. 10. Knobs 47 and 172 are now rotated in a clockwise direction until dial 125 reads 100 and dial 161 reads zero, which adjustment moves the push rod 28 and core 27 to their extreme rearward position. The iron block 183, see Figs. 1 and 2, is then raised or lowered until the oscillator circuit 12 is tuned to 100 megacycles, whereupon the block is secured in fixed position by tightening the screws 185. The adjustment of this block has the effect of changing the slope of the tuning curve of resonant circuit 12. After such adjustment of the circuit to the indicated frequencies, rotation of knob 172 and adjusting screw 48 counterclockwise, as indicated by the arrow in Fig. 1, for a distance of one division on continuous dial 161 permits the cam C and push rod 28 to be moved forwardly a distance .0001 inch, thereby tuning the circuit 12 to a frequency of 100,010 kc. as determined by taking the sum of the readings on dials 125 and 161. The knob 172 is now rotated another dial division of dial 161 which causes push rod 28 and core 27 to be moved forwardly another .0001 inch under the bias of spring 33 and oscillator circuit 12 to be tuned to the frequency of 100,020 kc., as determined by adding together the two dial readings. When the knob 172 has thus been rotated through 100 dial divisions of dial 161, the circuit 12 will be tuned to 101 megacycles and the iron core 27 will have been adjusted .010 inch forwardly of its initial position. By now rotating the knob 172 and dial 161 to their initial or zero positions, push rod 28 and core 27 will be moved rearwardly by screw 48 to their initial position, and the frequency of oscillator circuit 12 will again be 100 megacycles. By now rotating knob 47 counterclockwise, as indicated by the arrow in Fig. 1, until the outer dial 125 reads 101 megacycles, the cam disc 53 is rotated until the next lower ball 54 thereon comes into engagement with the bearing surfaces 55 of push rod 28. Under the bias of spring 33, the push rod is moved forwardly a distance of .010 inch and causes the circuit 12 to be tuned to the indicated dial reading of 101 megacycles. Any slight inaccuracy of the tuning to this frequency may be compensated for by the operator withdrawing a screw 187 from a threaded opening 188 provided in the cam casing 23, see Figs. 2 and 4. A special micrometer head (not shown) provided for this purpose is now inserted in the opening 188, the end of the micrometer screw engaging the end 80 of spring 78, Fig. 7, and by rotating the micrometer screw the compensating block 77 which is in engagement with curved end 52, Fig. 12, of adjusting screw 48 is moved inwardly within its groove 75 to move cam disc 53 and push rod 28 rearwardly a suitable amount until circuit 12 is tuned to the desired frequency. Should the compensating block be adjusted inwardly in its groove slightly too far, the micrometer head is withdrawn from the opening 188 and a tool inserted therethrough which has a projecting end portion which may be inserted within the opening 81, Fig. 7, of spring 78, then by pulling on the tool the compensating block may be pulled outwardly in its groove a substantial amount. After removing such tool, the micrometer head is again inserted in the opening 188 and the compensating block 77 moved inwardly in its groove by the micrometer screw until the correct resonant frequency of circuit 12 is secured.

The radio tuner may now be tuned consecutively through the next one hundred settings by rotating the knob 172 and dial 161 consecutively through one hundred divisions of this dial one by one until the dial reads 1000, when the circuit 12 will be tuned to 102 megacycles and push rod 28 will be .020 inch forwardly of its initial position. By now rotating knob 172 clockwise until continuous dial 161 reads zero and then rotating the knob 47 and dial 125 counterclockwise until a reading of 102 megacycles appears on this dial, the third ball 54 on cam disc 53 will have been brought into engagement with the bearing surfaces 55 on push rod 28 and the circuit 12 will be again tuned to 102 megacycles. Any slight inaccuracy of the tuning for this dial position may be corrected in the manner above described by adjusting the compensating block 77 which is now in engagement with the end 52 of button 49 in its groove by the micrometer device in the manner above described. By continuing this operation repeatedly the circuit 12 may be tuned through all the frequencies corresponding to the 2500 dial settings and the tuning of the circuit adjusted to the desired value for each of the divisions on the outer dial 125 by adjusting the compensating blocks 77 in their grooves in the manner above described. It will be understood that, after all the compensating blocks have been appropriately adjusted, the screw 187 will again be screwed into the threaded opening 188, Figs. 2 and 4, thereby sealing the cam C, adjusting screw 48 and their associated parts in the casing 23 against the entrance of dust or dirt particles which might otherwise collect on different parts of the mechanism and destroy its accuracy by interfering with its proper operation. The radio tuner is then ready for operation, and it is found that within the short interval of four seconds the oscillator circuit 12 may be readily tuned from any frequency to any of the other frequencies corresponding to the 2500 different dial readings.

If it is desired to advance the push rod 28 rearwardly step by step by rotating the knob 47 and cam C clockwise, when the rotation of the cam is commenced the tapered surface 72 on the front of spring finger 70 (Figs. 5, 10 and 12) immediately comes into engagement with the conical surface 50 of button 49 and exerts a component of force on the spring finger and its underlying compensating block 77 which pushes the cam C rearwardly along its supporting spindle 59 into the position shown in Fig. 12, so that the end 51 of button 49 clears the edge of the next adjacent compensating block as this block is brought into position by the rotation of the cam. When the front face 82 of the next compensating block has been brought opposite the curved surface 52 on the end of button 49, the tapered surface 72 on its spring finger 70 rides down the conical surface 50 as the rotation of cam C continues and the cam moves forwardly under the bias of spring 33 (Fig. 4) until the spring finger is entirely clear of button 49 and the front face 82 of the block is in engagement with the curved surface 52 defining the end of button 49.

Referring to Fig. 9, the compensating block 77" is adjusted inwardly along its groove 75 in the cam by placing the end of the aforedescribed micrometer screw in engagement with the flat end 80" of its spring, and then rotating the micrometer screw a suitable amount. Should the compensating block accidentally be moved too far inwardly, it may be withdrawn by placing the end of the aforementioned tool in the hole 84 in the block and pulling the block outwardly in its groove, after which the block may be again moved inwardly by the micrometer screw to the correct position.

While the invention has been illustrated in connection with the tuning of an oscillator circuit, it will be understood that additional iron cores may be mounted on push rod 28 to tune the radio frequency circuits of a radio receiver or other radio device, in the manner illustrated and described in my aforementioned application. Furthermore, the push rod 28 may be used to operate an adjustable gage used for measuring the size of articles as illustrated in my aforementioned application or for operating the controlled element of any other device which is required to be adjusted within close limits.

While I have illustrated my invention as including a step cam as a spacing means for effecting different positions for the operated rod or member 28, each of which cam steps as described differs uniformly in thickness from the preceding one of said cam steps, it will be understood that for some purposes these cam portions may have any desired different thicknesses to meet the requirements of different purposes of use, whether the limited amount of movement of the screw or continuously operated drive member 48 is equal to the difference between successive thicknesses of the cam or not. It will further be understood that my invention is adapted for use where lesser degrees of accuracy of movement are permissible than for the uses described. For example, for the purpose of the relatively general grading or grouping of objects as to size, or the resonant selection of radio stations from a relatively small group of such stations such as the broadcast band, the high degree of accuracy described may not be required. In such cases the spacing means or cam C need not be provided with the balls 54, but may be an integral structure made from a single metal block with a degree of accuracy, in any case, that is commensurate with the intended purposes of the structure.

I have described what I believe to be the best embodiments of my invention. I do not wish, however, to be confined to the embodiments shown, but what I desire to cover by Letters Patent is set forth in the appended claims.

I claim:
1. A device for adjusting a driven member longitudinally comprising, in combination, a spacing cam having its rear face provided with a plurality of spaced apart balls disposed at successively increasing elevations, supporting means arranged to support said cam for both rotation and bodily movement, means for rotating the cam to bring successive balls thereof into engagement with said driven member, an adjusting screw having a fine pitch and supported with its rear end in engagement with the front surface of the cam, and a control knob connected to and arranged to rotate said screw.

2. A device as claimed in claim 1 in which the driven member is in alignment with the adjusting screw whereby the stress applied to the cam by the adjusting screw is transmitted directly through the material of the cam to the driven member.

3. A device as claimed in claim 1 in which the adjusting screw is supported in a nut having interiorly threaded portions which engage the threads of the screw at spaced apart regions thereof, and which includes clamping means arranged to bias the threaded nut portions into firm contact with the threads of the adjusting screw and thereby minimize the amount of backlash.

4. A device as claimed in claim 1 in which a stop device is provided to limit the rotation of the adjusting screw to less than a full revolution thereof, and a graduated dial is connected to the adjusting screw to indicate the setting of the driven member.

5. A device as claimed in claim 1 in which the increment in elevation between successive balls is substantially constant, a graduated rotatable dial connected to the cam and a second graduated rotatable dial connected to the adjusting screw, the graduations of both said dials being in terms of the same unit of measurement whereby the setting of the driven member may be determined by taking the sum of the dial readings.

6. A device as claimed in claim 1 in which the front face of the cam is provided opposite a plurality of the balls with surfaces slightly inclined with reference to a vertical plane passing therethrough, a plurality of thin tapered compensating blocks seated against said inclined surfaces and adapted to be displaced thereon, and means for retaining said compensating blocks in desired positions on the cam.

7. A device as claimed in claim 1 in which the front face of the cam is provided opposite a plurality of the balls with shallow grooves whose bottom walls are slightly inclined with reference to a vertical plane passing therethrough, a plurality of thin tapered compensating blocks seated in said grooves, and spring means for retaining said compensating blocks in desired positions in the said grooves.

8. A device as claimed in claim 1 in which the adjusting screw near its rear end is provided with a curved surface adapted to engage spaced apart areas provided on the front face of the cam and push the cam rearwardly so that its front surface is momentarily out of engagement with the end of the adjusting screw in response to the rotation of the cam.

9. A cam having its rear face provided with a plurality of balls which are spaced apart by substantially equal distances and disposed at successively increasing elevations, the increment in elevation between successive balls being substantially constant, and means for regulating to close limits the thickness of the cam in the region of each of the balls, said last named means comprising a plurality of grooves formed in the front face of the cam and slightly tapered compensating blocks seated in and adapted to be moved along said grooves.

10. A cam as claimed in claim 9 in which the cam is disc shaped and the grooves are disposed substantially radially of the disc.

11. A cam disc mounted for rotation about a horizontal axis, said cam disc having its rear face provided with a plurality of balls which are spaced apart by substantially equal distances and disposed at successively increasing elevations, the increment in elevation between successive balls being substantially constant; the front face of the cam being provided opposite a plurality of the balls with surfaces slightly inclined with reference to a vertical plane passing therethrough, a plurality of tapered compensating blocks in desired positions on said inclined surfaces whereby the distance between the front face of each compensating block and the rear face of the corresponding ball may be adjusted to close limits.

12. A cam disc as claimed in claim 11 in which means are provided for retaining the compensating blocks in position comprising a plurality of fingers formed of resilient material and engaging the front faces of the compensating blocks to bias their rear faces against the said inclined surfaces.

13. A cam as claimed in claim 11 in which the balls and compensating blocks are composed of materials having a substantially higher degree of hardness than the material of the cam disc itself, the balls being hard enough to be driven into the material of the cam disc without suffering any substantial distortion, and being so driven into the material of the cam disc.

14. A cam comprising a disc mounted for rotation about a horizontal axis, said disc having its rear face provided with a plurality of balls which are spaced apart by substantially equal distances and disposed at successively increasing elevations, the increment in elevation between successive balls being substantially constant; and means for regulating to close limits the thickness of the cam in the region of several of the balls, said last named means comprising a plurality of substantially radially disposed grooves formed in the front face of the disc, the bottom walls of said grooves being slightly inclined with reference to a vertical plane passing therethrough; slightly tapered compensating blocks seated in said grooves and a plurality of springs arranged to bias the compensating blocks against the sides of the grooves, the outer ends of the springs being in engagement with the outer ends of the compensating blocks whereby any compensating block may be moved inwardly in its groove in response to the application of pressure to the outer end of its spring.

15. A cam as claimed in claim 14 in which the inner ends of the springs are in engagement with the inner ends of the compensating blocks whereby any compensating block may be moved outwardly in its groove in response to a pull on the outer end of its spring.

16. A cam as claimed in claim 14 in which the outer ends of at least some of the springs are hook shaped.

17. A cam as claimed in claim 14 in which at least some of the compensating blocks are provided with apertures adapted to receive the end of a tool whereby a compensating block may be moved outwardly in its groove in response to a pull on the tool.

18. A stepped spacing cam comprising a main body member and a plurality of tapered compensating blocks carried by the body member in engagement therewith, the surface of the body member adjacent each compensating block having a slope substantially complementary to the taper of said block, whereby the combined thickness of said body member and any block may be adjusted by the adjustment of said block lengthwise of said slope.

19. A cam-like member having a rear surface provided with a plurality of spaced apart bearing areas of different elevation and adapted to successively engage a driven member in response to movement of the cam, the front face of the cam being provided opposite a plurality of the bearing areas with one or more slightly inclined surfaces, said cam comprising a plurality of similarly but oppositely tapered compensating blocks disposed against said inclined surface or surfaces, and means for biasing the compensating blocks into engagement with said inclined surface or surfaces whereby the thickness of the cam in the region of each of the bearing areas may be regulated to close limits in response to the adjustment of the compensating blocks along the said inclined surface or surfaces.

SIDNEY Y. WHITE.